Figure 2:
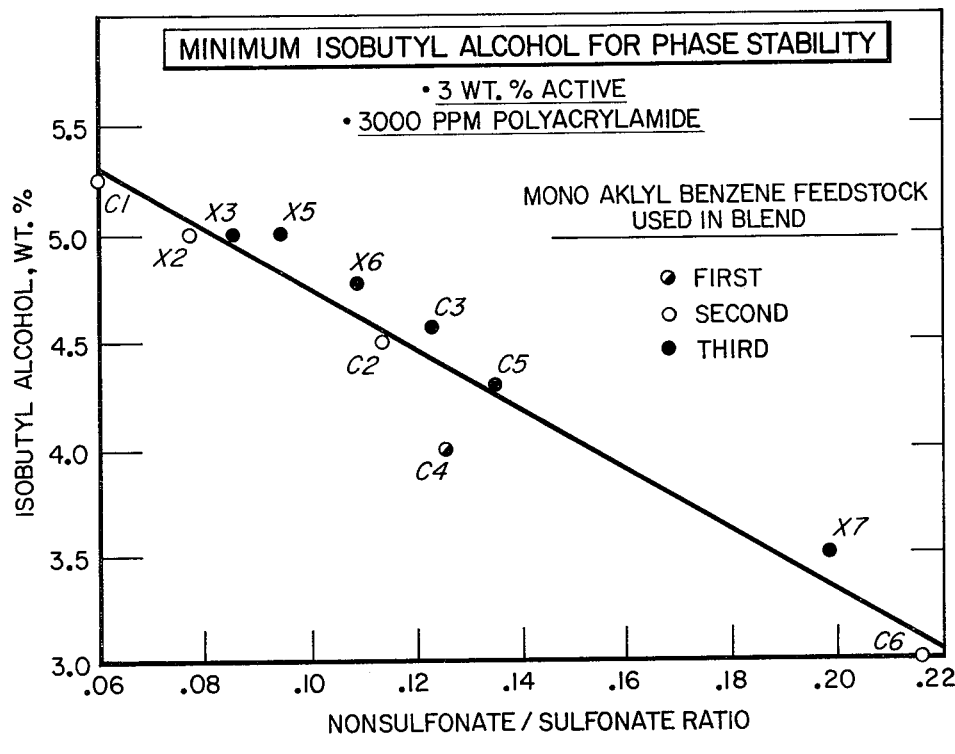

United States Patent [19]

Stokke et al.

[11] 4,435,295
[45] Mar. 6, 1984

[54] SULFONATE FOR WATERFLOODING

[75] Inventors: Olaf M. Stokke; Roy C. Sias, both of Ponca City, Okla.

[73] Assignee: Conoco Inc., Ponca City, Okla.

[21] Appl. No.: 379,210

[22] Filed: May 17, 1982

[51] Int. Cl.³ .......................... C09K 7/02; E21B 43/16
[52] U.S. Cl. ................................ 252/8.55 D; 166/274; 166/275
[58] Field of Search .................. 252/8.55 D; 166/274, 166/275

[56] References Cited

U.S. PATENT DOCUMENTS

| | | | |
|---|---|---|---|
| 3,648,773 | 3/1972 | Gogarty | 166/273 |
| 3,714,062 | 1/1973 | Askew et al. | 166/273 |
| 3,901,317 | 8/1975 | Plummer et al. | 252/8.55 D |
| 3,952,803 | 4/1976 | Kerfoot et al. | 252/8.55 D |
| 3,997,451 | 12/1976 | Plummer et al. | 252/8.55 D |
| 4,058,467 | 11/1977 | Sias | 252/8.55 D |

*Primary Examiner*—Christine M. Nucker
*Attorney, Agent, or Firm*—Cortlan R. Schupbach, Jr.

[57] ABSTRACT

An improved sulfonate suitable for waterflooding is formed by sulfonating a blend of two alkyl aromatic feedstocks, one being a high molecular weight monoalkylbenzene while the second is a mixture of normal alkyl aromatic compounds such as monoalkyl benzenes, dialkylbenzenes, and diphenyl alkanes. This feedstock is either sulfonated after blending or before blending to provide a blended non-sulfonate/sulfonate ratio in the range of 0.10 to 0.25. The sulfonate effectiveness of this system increases as the non-sulfonate/sulfonate ratio increases.

6 Claims, 2 Drawing Figures

SULFONATE FOR WATERFLOODING

This invention relates to a method for producing an improved sulfonate suitable for waterflooding recovery operations. More specifically, the present invention provides an improved sulfonate for waterflooding operations by reacting a two component alkyl aromatic feedstock in a sulfonation reaction wherein the ratio of non-sulfonated material to sulfonated is in the range of 0.10 to 0.25, thus unexpectedly increasing the effectiveness of the waterflood agent. The non-sulfonated material, or non-sulfonate, is defined as the unreacted feedstock plus hydrocarbon sulfonation by-products such as sulfones.

The present invention has application in the treatment of oil or gas producing wells where it is desired to further produce or "sweep" hydrocarbons from formations surrounding said wells. Thus production rates of hydrocarbon producing wells are improved by improving secondary recovery wherein a nearly complete removal of oil from such formations results.

Adding surface active materials to a waterflood in order to lower the interfacial forces which interact between oil, water and reservoir rock is well known. The use of such surface active materials reduces interfacial tension, thereby enabling oil which is left as a residual from a normal waterflood to be mobilized by the pressure gradients attainable in a waterflood, which can be used either with or without a polymer "pusher". While various sulfonates suitable for lowering these interfacial tensions in waterflood operations are well known, many leave undesirably high amounts of hydrocarbons in the formation at the conclusion of the flood. During such operations a particularly important feature of the waterflood process is the need for proper mobility control and phase control to insure efficient use of the sulfonate material.

In dilute aqueous sulfonate systems, the addition of a polymer such as a polyacrylamide or a polysaccharide is often used to increase the viscosity of the surfactant flood. However, the use of these polymers poses problems since the addition of these polymers can result in an unstable system with surfactant and/or polymer precipitating, even before injection into the well. Even when an initially phase stable surfactant system containing polymer has been established, such systems can lose phase stability as mixing and dilution occur during a sweep through a reservoir. At a minimum, a formulation which remains phase stable during injection and penetration past the sand face is desirable to insure good injectivity and uniform distribution of the formulation into the reservoir.

The prior art has attempted to improve phase stability by the addition of a co-solvent. Common co-solvents include alcohols such as isobutyl alcohol, isopropyl, secondary butyl alcohol, tert-butyl alcohol and amyl alcohols. However, alcohols provide an additional expense and must be used carefully. Other co-solvents commonly used at high salinities and hardness levels include ethoxylated alcohols and ether sulfates. An excess of co-solvent in the surfactant system can reduce the effectiveness of the surfactant in lowering interfacial tensions. Thus this balance is extremely critical and can be distrubed even as the material is injected into an underground reservoir.

It would therefore be of great benefit to provide a system which is phase stable during injection and which has improved utility as a surfactant in waterflood operations and which reduces the criticality of co-solvents. Preferably such a system would use readily available materials and existing preparation techniques allowing the use of present day equipment.

It has now been discovered according to the present invention that an improved sulfonate for waterflooding can be obtained from a blend of two alkyl aromatic components with a reduced degree of sulfonation as characterized by the non-sulfonate/sulfonate ratio, the ratio of unreacted feedstock plus sulfonation by-products such as sulfones to the product sulfonate. The two alkyl aromatic components basically comprise high molecular weight monoalkylbenzenes, and a mixture of n-alkyl aromatic compounds.

Thus the present invention provides an improved sulfonate composition comprising from about 80 to about 20 parts by weight of monoalkylbenzenes having an average molecular weight of from about 400 to about 490, together with from about 20 to about 80 parts by weight of n-alkyl aromatic compounds having an average molecular weight of from about 325 to about 385, a non-sulfonate/sulfonate ratio of more than 0.10, but less than 0.25. The sulfonated materials of the present invention can be broadly used with alcohol cosolvents in relatively fresh (hardness less than about 100 ppm) reservoirs having a salinity of about 1% or less. Depending on the type of cosolvents employed, the applicable salinity can be extended, or as taught in the literature with other cosolvents, the applicable salinity range can be greatly extended as can be hardness level.

Preferably the mixture is sulfonated to a non-sulfonate/sulfonate ratio of from about 0.10 to about 0.25 but a non-sulfonate/sulfonate ratio of from 0.10 to 0.19 is more preferred, and from about 0.13 to about 0.16 is most preferred. The feedstock composition can be sulfonated either prior or subsequent to blending and such is not critical to the present invention. However, it is necessary that the non-sulfonate/sulfonate ratio will be below about 0.25 and above about 0.10 and that the sulfonate products have an equivalent weight of about 400, and range from about 385 to about 420 as determined by ASTM D 3712-78, modified to remove any alcohol present prior to carrying out the test.

The weight ratios of the monoalkyl benzene feedstock and the n-alkyl aromatic feedstock can range from about 80/20 to about 20/80 respectively, but from about 65/35 to about 35/65 is preferred. The exact ratio is not critical so long as the criteria of non-sulfonate/sulfonate ratio of less than about 0.25 and more than about 0.10 and an average equivalent weight of about 400 is reached with the sulfonated blended product. Materials meeting this description impart superior phase stability to surfactant formulations and have the solubility characteristics necessary for highly effective recovery of oil from underground reservoirs.

The unique and unexpected feature of the present invention is the effectiveness as a water external waterflood additive of the sulfonate of the present invention which is characterized by the non-sulfonate/sulfonate ratio, the ratio of unreacted feedstock plus sulfonation by-products such as sulfones to the product sulfonate. Using the process of the present invention, the sulfonate effectiveness increases as the amount of non-sulfonate from the sulfonation step increases, within the range given in the invention. Since the present invention is an aqueous surfactant system, this is distinctly unexpected. While the reason for the effect of the present invention is not known, a hypothesis has been formed for the unexpected effectiveness of this improved sulfonate. We wish to be clear that this is merely a hypothesis and we do not wish to be bound thereby.

We believe that the phase stability of the surfactant is improved as the amount of non-sulfonate material increases from the reaction step. While this is not expected in an aqueous surfactant system, as the ratio of non-sulfonate/sulfonate in the sulfonation process increases, the amount of co-solvent used (in this case isobutyl alcohol) which is required for phase stability with a given amount of sulfonate decreases. Also unexpectedly, the sulfonate equivalent weight appears to be relatively independent of the non-sulfonate/sulfonate ratio. We do not know if this behavior is the consequence of a change in the nature of the sulfonate, or non-sulfonate, or both, as the non-sulfonate/sulfonate ratio changes.

The sulfonation feedstock of the present invention is a blend of two alkyl aromatic components. The first component is predominantly a high molecular weight monoalkylbenzene with minor amounts of paraffin and dialkylbenzene, usually prepared by the alkylation of benzene with an olefin having an average carbon atom content of around 20 carbon atoms or higher, and range generally from 16 carbon atoms to about 30 carbon atoms. The average molecular weight of the mono-alkyl benzene ranges, depending on alkylation conditions from about 400 to about 490, preferably from about 440 to 475. The olefinic materials are commonly obtained from several well known processes such as Ziegler ethylene polymerization technology to produce alpha olefins. These processes can be illustrated to one skilled in the art by reference to U.S. Pat. Nos. 3,478,124; 3,482,000; 3,502,741; 3,584,071; 3,682,647; and 3,689,584.

The second feedstock component is a total bottoms product from a detergent alkylate manufacture and is a complex mixture of many n-alkyl aromatic compounds. These materials are primarily monoalkyl benzenes, dialkyl benzenes alkyl tetralines and diphenyl alkanes, with a minor amount (around 10%) of other alkyl aromatics. In these bottoms the alkyl groups are linear. Typically, the average molecular weight is from about 325 to about 385, preferably from about 340 to about 365 and contains substantial amounts of alkyl groups containing from about 8 to about 18 carbon atoms. This feedstock can be obtained from detergent alkylate processes, whether catalyzed by aluminum chloride or by hydrogen fluoride or other Friedel-Crafts catalysts. The aluminum chloride process employing chloroparaffins is known to those skilled in the art as is illustrated by U.S. Patent 3,316,294 hereby incorporated in its entirety into the instant specification. In this reference a process of preparing a detergent alkylate wherein the process comprises the following steps, broadly states: (a) separating a fraction of substantially straight-chain $C_8$–$C_{18}$ hydrocarbons (preferably $C_{10}$ to $C_{14}$ hydrocarbons) from a petroleum distillate substantially free of olefins and containing said straight-chain hydrocarbons together with non-straight chain hydrocarbons, (b) chlorinating said fraction to the extent whereby between about 10 and about 35 mole percent of the straight-chain hydrocarbons present are substantially only monochlorinated, (c) alkylating an aromatic compound, selected from the group consisting of benzene, a lower alkyl substituted benzene and mixtures thereof, with the chlorination product of step (b) in the presence of an alkylation catalyst. The desired product is a distillate fraction obtained from the alkylation reaction mixture. In the present invention, however, the desired product for use in our method is, preferably, the bottoms fraction of the alkylation reaction mixture. The hydrogen fluoride process employing olefins produced by dehydrogenation of $C_8$ to $C_{18}$ n-paraffins is also well known to those skilled in the art as is illustrated by U.S. Pat. Nos. 3,312,734; 3,413,373; 3,358,253; 3,349,144; 3,426,092; and 3,484,498.

In this process the residual bottoms are a complex mixture of many n-alkyl aromatic compounds, primarily alkyl benzenes, alkylated tetralines and diphenyl alkanes with a minor amount (around 10%) of other alkyl aromatics. Typically, the molecular weight ranges from about 325 to about 385, preferably from about 340 to about 365.

The two alkylates are blended at any desired weight ratio to provide the feedstock to the present invention. Each ratio can range about 80/20 to about 20/80. However, from about 65/35 to about 35/65 are preferred. The blend can be sulfonated with anhydrous $SO_3$ by any conventional means to provide the sulfonic acid for neutralization. In addition, it is not critical whether the feedstocks are blended prior to sulfonation or after sulfonation. Sulfonation can be carried out by any conventional means well known to those skilled in the art. Sulfonation procedures are generally illustrated by reference to U.S. Pat. Nos. 3,169,142; 3,328,468; and 3,427,342.

As previously stated, the present invention is useful in conjunction with well-known techniques of waterflooding including the use of water soluble polymers.

Water soluble polymers useful in the practice of the present invention are well known in the art. Examples of such polymers are cellulose ethers such as the various carboxylalkyl cellulose ethers, e.g. carboxyethyl cellulose and carboxylmethyl cellulose (CMC); mixed ethers such as carboxylalkyl hydroxylalkyl ethers, e.g. carboxylmethyl hydroxylethyl cellulose (CMHEC); hydroxyalkyl celluloses; such as hydroxyethyl cellulose and hydroxypropyl cellulose; alkyl celluloses such as methyl cellulose, ethyl cellulose, and propyl cellulose; alkylcarboxylalkyl celluloses such as ethylcarboxymethyl cellulose; alkylalkyl celluloses such as methylethyl cellulose; and hydroxyalkylalkyl celluloses such as hydroxypropylmethyl cellulose and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC, etc.

Also useful in the instant invention are polyalkoxylated organic materials such as the polyethoxylated and/or polypropoxylated aliphatic, aromatic, or alicyclic alcohols, such as the natural gums or resins e.g., the Guar gums, carboxymethylcellulose, the polyacrylic acid esters, the polyvinyl esters or ethers, or the like. Polysaccharides well known to those skilled in this art can also be used.

Further examples of useful water-soluble polymers are organic homopolymers, copolymers, terpolymers, etc., and chemically modified and/or chemically substituted (inorganic and/or organic substituted groups) products thereof. The polymers can have average molecular weights within the range of 500,000 to about 30,000,000 or more, preferably about 1,000,000 to about 25,000,000 and more preferably about 5,000,000 to about 20,000,000. The molecular weight used depends upon the permeability and rock properties of the reservoir to be flooded. Especially useful polymers are the polyacrylamides having about 0-70 percent of the carboxy amide groups hydrolyzed to carboxyl groups, e.g. fractionated Pusher polymers (Pusher is a trademark of Dow Cemical Company, Midland, Mich., USA), the Pusher polymers are defined in U.S. Pat. No. 3,827,964 to Sandiford et al and U.S. Pat. No. 3,039,529 to McKennon. Other examples of useful polymers are defined in U.S. Pat. Nos. 3,842,942 to Engelhardt et al; 3,282,337 and 3,399,725 to Pye; and 3,679,000 to Kaufman.

The instant invention is more concretely described with reference to the examples below wherein all parts and percentages are by weight unless otherwise specified. The examples are provided to illustrate the present invention and not to limit it.

EXAMPLE 1

The effectiveness of the sulfonate of the present invention was demonstrated by tertiary oil recovery tests conducted in 1 inch by 1 inch by 1 foot Berea sandstone cores held at a reservoir temperature of 115° F. Following standard procedures, the cores were encased in epoxy resin, evacuated, saturated with a synthetic brine and reduced to irreduceable water saturation with filtered and degassed Big Muddy crude oil (obtained from the Big Muddy, Wyoming, U.S.A reservoir) amd waterflooded to residual oil saturation.

Figure 1:
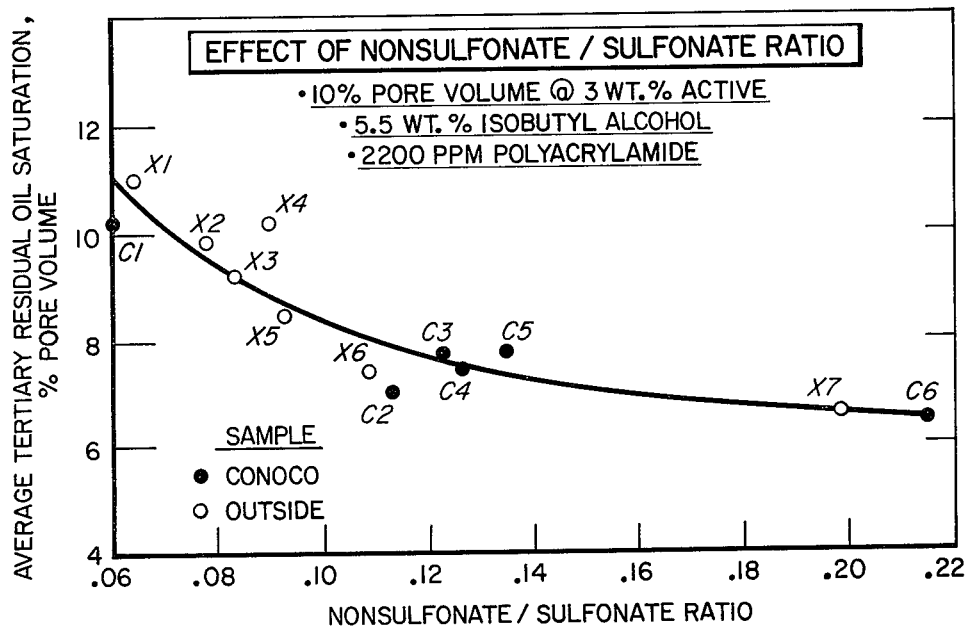

Displacement tests were made by injecting a 10% pore volume slug containing 3 weight percent active sulfonate with a 5.5 weight percent isobutyl alcohol co-solvent and 2,200 parts per million of polyacrylamide polymer (Pusher 500, trademark of and sold by the Dow Chemical Company) in synthetic brine of less than one percent salinity. That this formuation is a dilute aqueous surfactant formulation is evident from the fact that it, and all surfactant formulations reported herein, contained at least 89 percent by weight water. The injection rate was constant at a frontal advance rate of approximately 1 foot per day. The surfactant flood was displaced by 1.5 pore volumes of polymer solution having a mobility favorable for displacing the surfactant. Sulfonations carried out both by Conoco Inc. and commercial processers were compared at various non-sulfonate/sulfonate ratios. The 40-60 blend of monoalkyl benzene and n-alkyl aromatic material respectively were used as the feestock base. The average tertiary residual oil saturations for several displacement tests as determined by core extractions is set forth in Table 1 and graphically illustrated in FIG. 1. Example C4 utilized feedstocks separately sulfonated and thereafter blended prior to use.

TABLE 1

| Effect of Non-Sulfonate/Sulfonate Ratio | | |
| --- | --- | --- |
| Sulfonate Sample | Non-Sulfonate/ Sulfonate Ratio | Average Tertiary Residual Oil Saturation, % PV |
| C1 | .060 | 10.2 |
| X1 | .064 | 11.0 |
| X2 | .078 | 9.8 |
| X3 | .084 | 9.2 |
| X4 | .090 | 10.2 |
| X5 | .093 | 8.5 |
| X6 | .109 | 7.4 |
| C2 | .113 | 7.0 |
| C3 | .122 | 7.8 |
| C4 | .126 | 7.5 |

TABLE 1-continued

| Effect of Non-Sulfonate/Sulfonate Ratio | | |
| --- | --- | --- |
| Sulfonate Sample | Non-Sulfonate/ Sulfonate Ratio | Average Tertiary Residual Oil Saturation, % PV |
| C5 | .135 | 7.8 |
| X7 | .199 | 6.6 |
| C6 | .215 | 6.4 |

C - Conoco Sulfonated
X - Commercially Sulfonated

Table 1 shows that oil recovery increased as the non-sulfonate/sulfonate ratio increased, leaving a smaller amount of residual oil in the cores.

EXAMPLE 2

Phase stability studies were made by preparing samples fixed at 3 weight percent surfactant and 3000 parts per million polyacrylamide polymer (Pusher 500, trademark of and sold by Dow Chemical Company) and synthetic brine (of less than one weight percent salt) at concentrations of isobutyl alcohol (IBA) which were varied in increments of about 0.25 weight percent. Samples prepared were placed in a constant temperature bath at 115° F. and shaken after equilibrium temperature was reached. One week later the samples were observed visually for phase stability. Phase stable is defined as the solution transmitting intense light, and visually appearing to be clear without appreciable cloudiness or merkiness, and visually appearing to be single phase without appreciable precipitate or suspended particles in agglomeration. With this in mind and insofar as the surfactant formulations are primarily water and the non-sulfonate constituents plus cosolvent, polymer, and salt are solublized in a highly aqueous system, we define these surfactant formulations as water external. Minimum concentrations of isobutyl alcohol required for phase stability were determined. Results of these tests are set forth in Table II wherein a 40-60 blend as described in Example 1 was used.

TABLE 2

| PHASE STABILITY | | | |
| --- | --- | --- | --- |
| Sulfonate Sample | Non-Sulfonate/ Sulfonate Ratio | Monoalkyl Benzene Feed- Stock Sample | Minimum IBA for Phase Stability, w/o |
| C1 | .060 | 2nd | 5.25 |
| X2 | .078 | 2nd | 5 |
| X3 | .084 | 3rd | 5 |
| X5 | .093 | 3rd | 5 |
| X6 | .109 | 3rd | 4.75 |
| C2 | .113 | 2nd | 4.5 |
| C3 | .122 | 3rd | 4.57 |
| C4 | .126 | 1st | 4 |
| C5 | .135 | 3rd | 4.25 |
| X7 | .199 | 3rd | 3.5 |
| C6 | .215 | 2nd | 3.0 |

It is apparent that the phase behavior is a function of the particular monoalkylbenzene feedstock as set forth in FIG. 2. The 3 samples of feedstock monoalkylbenzenes had slight differences in a paraffin fraction content which could not be sulfonated and which show as non-sulfonated feedstock in normal product analysis.

In order to confirm this hypothesis, the experimentally determined nonsulfonate/sulfonate ratio was corrected for the paraffinic fraction introduced with monoalkyl benzene feedstock resulting in a similar grouping of the FIG. 2 results, with slightly less scatter.

Example 2 shows that the phase stability of the surfactant slug of constant surfactant concentration improves as the nonsulfonate/sulfonate ratio increases.

As previously stated, the feedstock blend can be sulfonated either batchwise or continuously to provide the sulfonic acid which is neutralized usually with aqueous sodium hydroxide to provide the sodium sulfonate useful as an enhanced oil recovery surfactant. Low molecular weight alcohols can be added during the neutralization step to aid in processing. However, careful control must be maintained of the critical non-sulfonate/sulfonate ratio such that it is matinained below about 0.25 and above about 0.10. The preferred ratio is from about 0.10 to about 0.19 and the most preferred is from about 0.13 to about 0.16. The instant process has its peaked effectiveness at an non-sulfonate to sulfonate ratio of about 0.16 after which little benefit is gained up to about 0.25. Thereafter no additional benefit is gained and the additional cost of sulfonation makes process less desirable economically. In fact if the non-sulfonate/sulfonate ratio became too high, not only would the low yields drastically increase the sulfonate cost, very high concentrations of non-sulfonate materials would be expanded to eventually result in poor phase stability.

EXAMPLE 3

An attempt was made to determine if the non-sulfonate material used was unique in effect. To sample X3 having a non-sulfonate/sulfonate ratio of 0.084 were added non-sulfonate different hydrocarbon materials, the second feedstock component described previously, a high molecular weight alkylate having an average molecular weight of about 400, and kerosene. These non-sulfonate hydrocarbon materials were added separately in individual tests to increase the overall non-sulfonate/sulfonate ratio to a value of 0.20 to match the value of sample X7. Also, Big Muddy Crude Oil was added to sample X5 to increase the non-sulfonate/sulfonate ratio from 0.093 to 0.15, a value intermediate between samples C5 and X7. Samples comparable to those of Example 2 were evaluated for phase stability following the procedure of Example 2. Results are shown in Table 3.

TABLE 3

| | Adjusted Non-sulfonate/Sulfonate Ratio Phase Stability | | |
|---|---|---|---|
| Sulfonate Sample | Hydrocarbon Additive | Non-Sulfonate/ Sulfonate Ratio | Minimum IBA for Phase Stability, w/o |
| X3 | None | .084 | 5 |
| X3 | Second Feedstock* | .20 | 4.5 |
| X3 | 400 MW Alkylate* | .20 | 4.5 |
| X3 | Kerosene* | .20 | 4.5 |
| X7 | None | .199 | 3.5 |
| X5 | None | .093 | 5 |
| C5 | None | .135 | 4.25 |
| X5 | Big Muddy Crude Oil* | .15 | 5 |
| X7 | None | .199 | 3.5 |

*Adjusted Ratio: (Nonsulfonate plus added non- sulfonated hydrocarbon)/sulfonate The results clearly show that the attempts to reduce the alcohol requirement for phase stability significantly by artificially increasing the non-sulfonate/sulfonate ratio failed. The addition of kerosene or Big Muddy Crude Oil failed completely to reuduce the alcohol requirement by as much as 0.5 wt/o. Also, the addition of the second feedstock or a 400 molecular weight alkylate reduced the alcohol requirement marginally by about 0.5 wt/o. Thus, the non-sulfonate/sulfonate ratio obtained in the reaction process is unique. However, it is not clear if this uniqueness resides with the non-sulfonate, or sulfonate, or the combination of both.

EXAMPLE 4

A series of batch sulfonation runs were carried out in which the amount of $SO_3$ was varied and the nonsulfonate to sulfonate ratio then determined on the resulting sodium sulfonate derivatives. Sulfonation conditions were 0.3 milliliters per minute $SO_3$, 8.8 liters per minute ambient air, and 50°–60° C. sulfonation temperature.

Vaporized sulfur trioxide in a dry air stream was charged to the alkylate in a reactor under controlled flow rate and temperature conditions. At the end of the sulfonation period the sulfonic acid was neutralized with aqueous sodium hydroxide to a pH of 7.5 to 8.5. During these experiments the base was added to the sulfonic acid using isobutyl alcohol during the neutralization. The sulfonate equivalent weight (EW) was determined by ash analysis. This equivalent weight was relatively independent of the nonsulfonate/suflonate ratio.

In the experiments the percentage non-sulfonated included any unsulfonated feedstock plus any sulfones which were formed during the reaction. The feedstock was a 40-60 blend of monoalkyl benzenes and n-alkyl aromatic compounds. The results of these sulfonation experiments are set forth in Table 4.

TABLE 4

| BATCH SO3SULFONATION EXPERIMENTS | | | |
|---|---|---|---|
| Experiment | 1 | 2 | 3 |
| Wt. Ratio $SO_3$/Alkylate Blend | 0.27 | 0.30 | 0.34 |
| Na Sulfonate Analyses | | | |
| % Sulfonate (Na Sulf) | 54.6 | 55.70 | 56.52 |
| % Nonsulfonate | 11.8 | 6.12 | 3.35 |
| Ratio Nonsulfonate/ Sulfonate | 0.22 | 0.11 | 0.06 |

While certain embodiments and details have been shown for the purpose of illustrating this invention, it will be apparent to those skilled in this art that various changes and modifications may be made herein without departing from the spirit or scope of the invention.

We claim:

1. An improved sulfonate composition for use in aqueous phase stable waterflooding systems comprising
   (a) from about 80 to about 20 parts per weight of monoalkyl benzene having an average molecular weight of from about 400 to about 490, together with
   (b) from about 20 to about 80 parts by weight of n-alkyl aromatic compounds having an average molecular weight of from about 325 to about 385, wherein the mixture is sulfonated to a nonsulfonate/sulfonate ratio of about 0.10 to about 0.25.

2. A composition as described in claim 1 wherein the mixture is sulfonated to non-sulfonated/sulfonate ratio of from about 0.10 to about 0.25.

3. A composition as described in claim 2 wherein the mixture is sulfonated to non-sulfonate/sulfonate ratio of from about 0.10 to about 0.19.

4. A composition as described in claim 3 wherein the feedstock is sulfonated after blending.

5. A composition as described in claim 3 wherein the feedstock is sulfonated prior to blending.

6. A composition as described in claim 4 wherein the sulfonate produced has an average equivalent weight of from about 385 to about 420.

* * * * *

UNITED STATES PATENT AND TRADEMARK OFFICE
CERTIFICATE OF CORRECTION

PATENT NO. : 4,435,295
DATED : March 6, 1984
INVENTOR(S) : Roy C. Sias and Olaf M. Stokke It is certified that error appears in the above-identified patent and that said Letters Patent are hereby corrected as shown below:

Column 5, line 11, "3,842,942" should be --3,842,492--.

Signed and Sealed this

Twelfth Day of June 1984

[SEAL]

Attest:

GERALD J. MOSSINGHOFF

Attesting Officer

Commissioner of Patents and Trademarks